United States Patent

[11] 3,574,986

| [72] | Inventor | Julian A. Dieter |
| | | Cincinnati, Ohio |
| [21] | Appl. No. | 767,157 |
| [22] | Filed | Oct. 14, 1968 |
| [45] | Patented | Apr. 13, 1971 |
| [73] | Assignee | R. A. Jones & Company, Inc. |
| | | Covington, Ky. |

[54] APPARATUS FOR VERTICALLY LOADING CARTONS
18 Claims, 9 Drawing Figs.

| [52] | U.S. Cl. | 53/35, 53/63, 53/252 |
| [51] | Int. Cl. | B65b 5/04 |
| [50] | Field of Search | 53/63, 35, 249, 250, 251, 252 |

[56] References Cited
UNITED STATES PATENTS

| RE21,288 | 12/1939 | Novotny | 53/248X |
| 3,123,956 | 3/1964 | Fisher | 53/35 |

*Primary Examiner*—Travis S. McGehee
*Attorney*—Wood, Herron and Evans

ABSTRACT: Method and apparatus for conveying cartons with their upper ends open, conveying articles to a location adjacent and above the cartons and for moving the articles from the article conveyor and dropping them into cartons carried on the carton conveyor.

Patented April 13, 1971  3,574,986

INVENTOR.
Julian A. Dieter
BY
Wood, Herron and Evans
ATTORNEYS

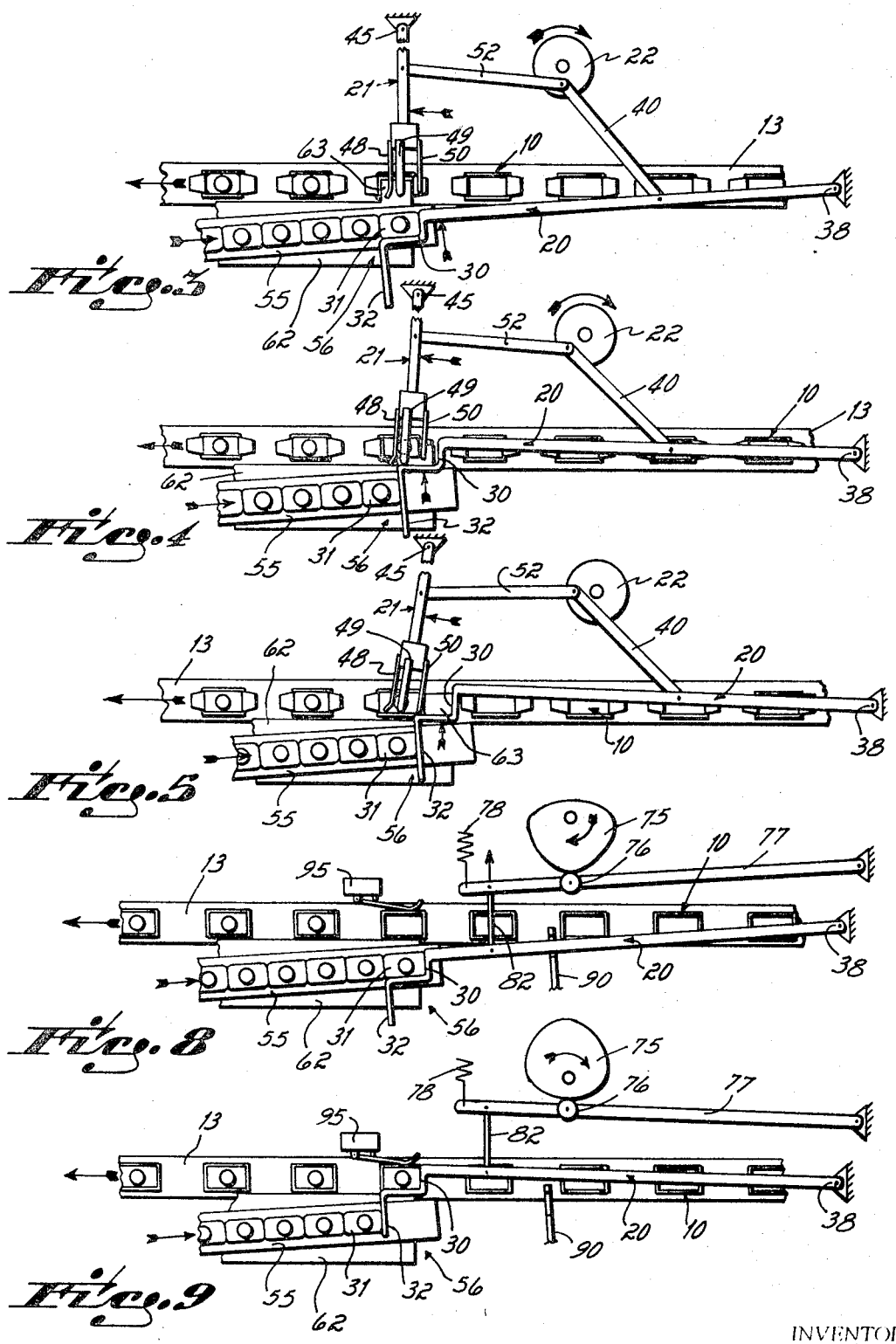

Patented April 13, 1971

INVENTOR.
Julian A. Dieter
BY
Wood, Herron & Evans
ATTORNEYS

APPARATUS FOR VERTICALLY LOADING CARTONS

This invention relates to cartoners and more particularly the invention is directed to a vertical loading method and apparatus for depositing articles into cartons.

Two types of cartoners—vertical loading and horizontal loading—are in common use in the industry. In vertical loading cartoners, the cartons are usually erected and closed automatically but the articles are placed into the opened cartons by hand. In horizontal cartoners, the erecting, loading and closing operations are all performed automatically. In such fully automatic operations, the cartons are carried by transport lugs on an endless conveyor and the articles are carried in buckets on an endless conveyor moving generally parallel to the carton conveyor, the articles being substantially fully under control at all times. As the articles are conveyed adjacent the cartons, pushers associated with the buckets move the articles gradually into the cartons, while maintaining the articles substantially fully under control.

An objective of the present invention has been to provide for the automatic loading of cartons in a vertical loading machine.

It has been another objective of the invention to provide for the vertical loading of articles into cartons without requiring the articles to be conveyed in buckets and maintained under full control as they are being deposited into cartons.

It has been still another objective of the invention to provide a vertical loading mechanism for a cartoner which is adapted for use with known vertical loading cartoners and which does not greatly increase the space requirement of such vertical loading cartoners.

Another objective of the invention is to provide a loader for a vertical cartoning machine which can be conveniently adapted to the loading of the various size articles into various size and spaced cartons.

Another objective of the invention is to provide a loader which is adapted for use with both continuous motion cartons and intermittent motion cartoners.

The objectives of the invention are attained by providing a loading mechanism of the present invention in association with a vertical loading cartoner wherein the cartons are conveyed by an endless conveyor. The loading mechanism includes an endless conveyor for bringing articles single file to a loading location adjacent to and at a level above the cartons. A loading arm has a pocket which sweeps between a position receiving the forward most article of the file and a position overlying the cartons so as to sweep the articles from the conveyor over to a position overlying the cartons. In one form of the invention the articles are then engaged by a second arm which has a jaw which slides each article off a dead plate into a respective carton. In a simpler form of the invention, the single arm sweeps the articles between the side flaps of the cartons, the side flaps tending to guide the articles into the cartons.

The objectives of the invention are further attained by disposing the article conveyor alongside a lineal section of the carton conveyor and conveying the articles in substantially the opposite direction from that of the cartons. This counterflow of articles and cartons minimizes the space required for the vertical loader and simplifies the structure and method by which the articles are engaged, conveyed to a position overlying the cartons, and dropped into the cartons.

These and other objectives of the invention will become more readily apparent from the following detailed description taken in conjunction with the accompanying drawings in which.

Figure 1:
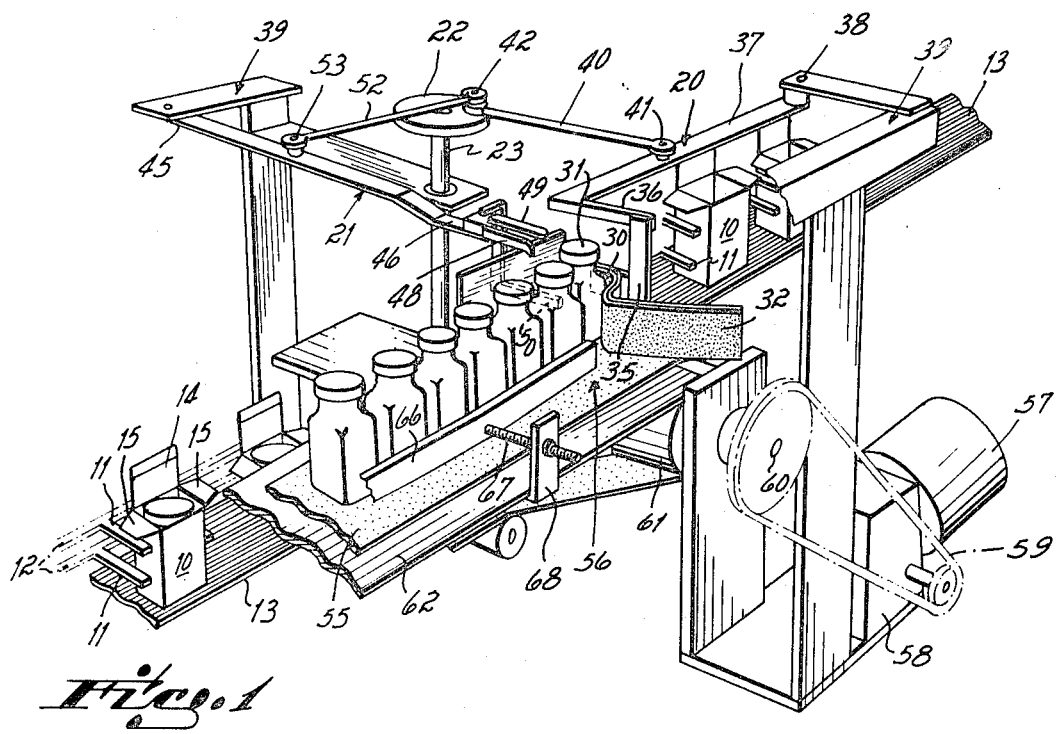
FIG. 1 is a fragmentary perspective view of one form of the invention employing two loading arms.
Figure 2:
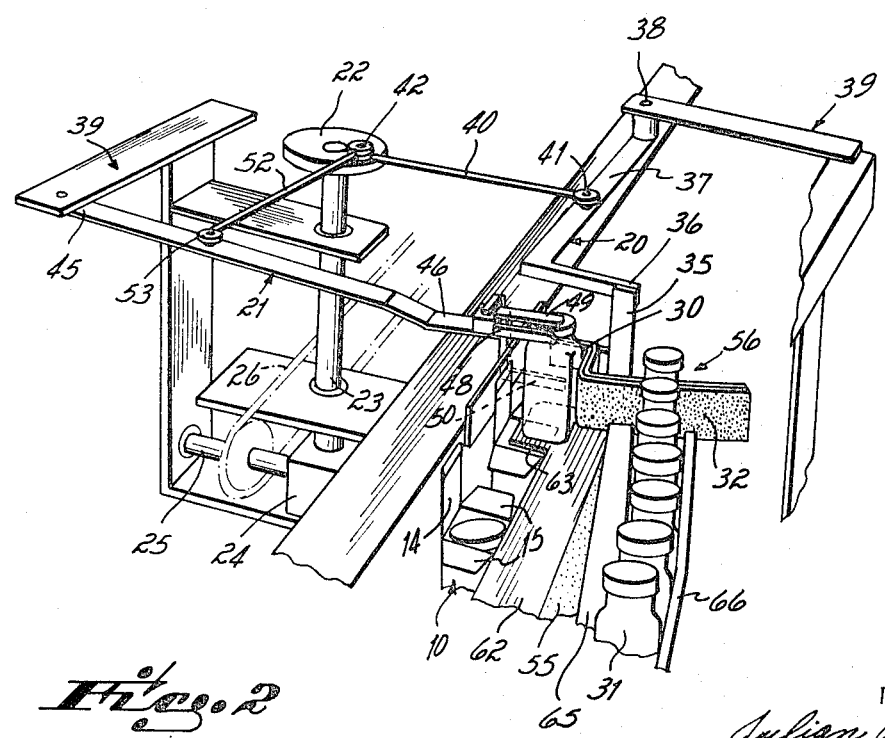
FIG. 2 is another fragmentary view of the same embodiment taken from a slightly different direction.
Figure 6:
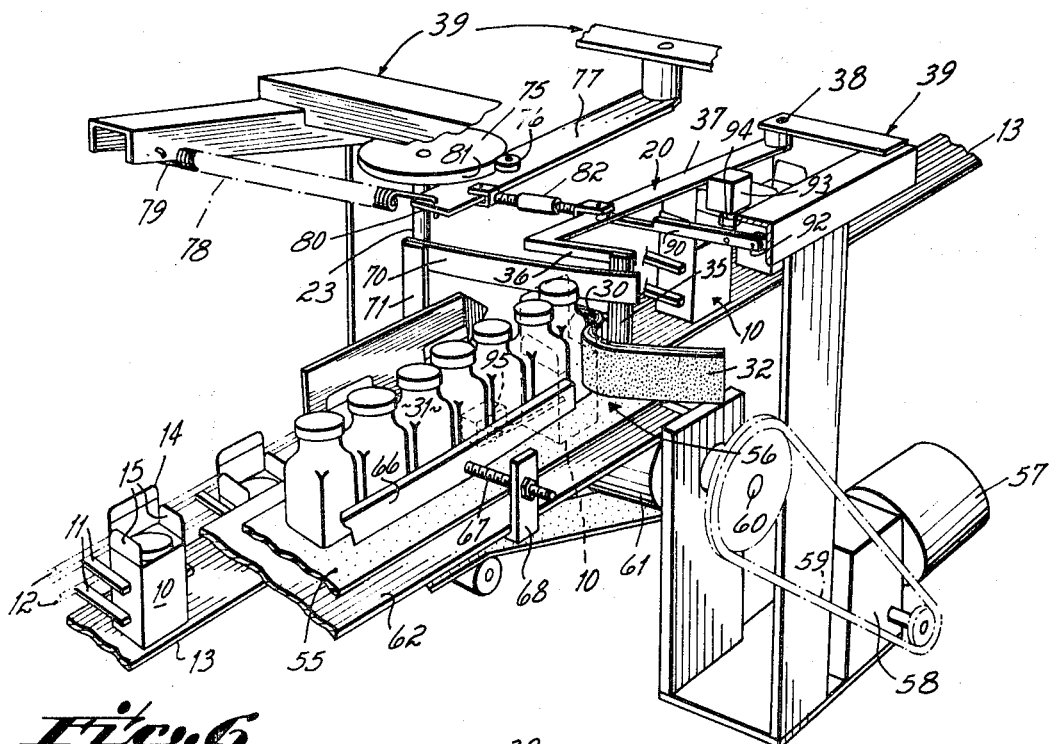
Figure 7:
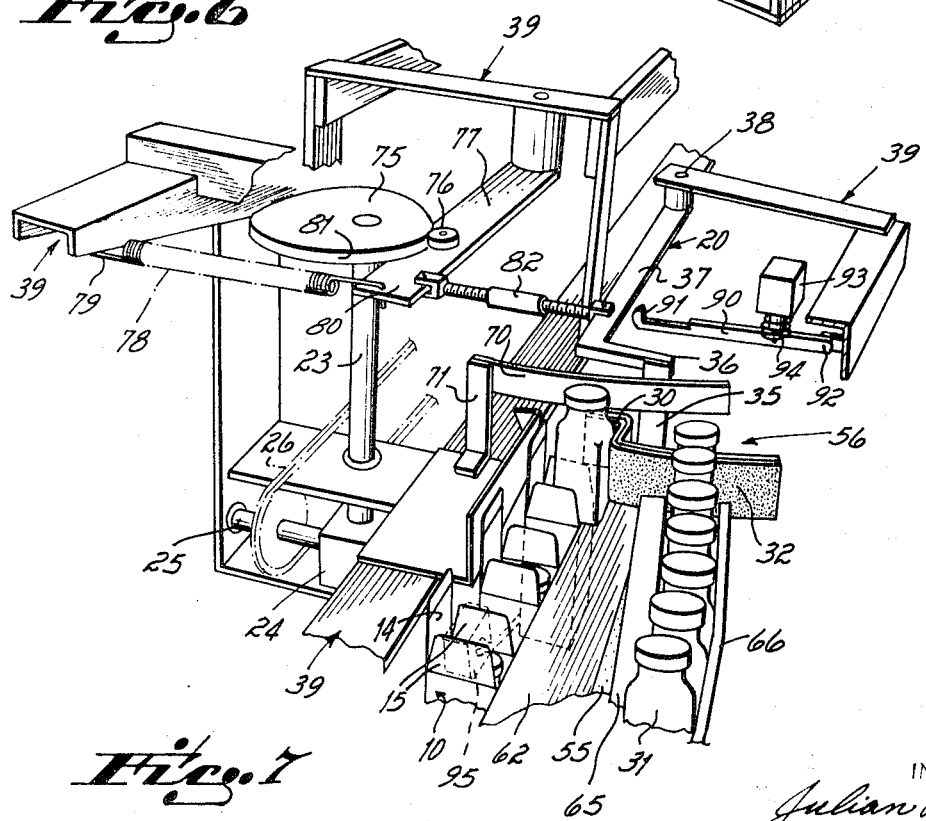

FIGS. 3—5 are diagrammatic top plan views illustrating the operation of that embodiment;

FIG. 6 is a fragmentary perspective view of an alternative form of the invention utilizing a single loading arm;

FIG. 7 is a fragmentary perspective view of the embodiment of FIG. 6 taken from a different direction; and FIGS. 8 and 9 are top plan views of the embodiment of FIGS. 6 and 7 illustrating its operation.

Referring to the embodiment of FIGS. 1—5, cartons 10 are conveyed between transport lugs 11 fixed on transport chains 12. The transport chains 12 are endless and move generally in a horizontal plane. The cartons captured between the transport lugs 11 slide along a fixed plate 13 and are preferably moving in a lineal direction at the loading location. In the illustrated embodiment, each carton has a tuck flap 14 and two side flaps 15. In the embodiment of FIGS. 1—5 wherein two loading arms are employed, the side flaps are preferably folded into a horizontal attitude so as to be out of the way of the loading mechanism as described below.

The loading mechanism includes a transversely movable loading arm 20 and a longitudinally movable loading arm 21. Both arms are driven from a rotating plate 22 mounted on a vertical shaft 23 and driven through a gear box 24 and horizontal shaft 25, the horizontal shaft being driven by a chain 26 which is connected to the carton conveyor drive. Thus the loader arm movement is fixedly timed to the movement of the cartons.

The transversely movable loading arm 20 is shaped to provide an L-shaped pocket 30 which is engageable with a lead article 31 to move the article in a transverse direction to a position overlying the carton 10.

An extension 32 of the loading arm 20 which projects away from the carton conveyor provides an article stop. The surface of the transverse arm 20 which engages the article, including the article stop 32, is preferably covered with a low friction material such as Teflon in order to minimize any abrading of the labels on the articles.

The loading arm 20 is mounted on a post 35 which is connected to one end 36 of an l-shaped lever 37 the other end of which is pivoted as at 38 to a fixed part of the machine framing indicated at 39. The arm is oscillated by a link 40 which is pivotally connected at one end 41 to a point intermediate the ends of the L-shaped lever 37, and is pivoted at its other end to a pin 42 which is eccentrically positioned on the rotary plate 22.

The longitudinally movable loading arm 21 is pivoted at one end 45 to the fixed framing 39 of the machine. The other end 46 carries two fingers adapted to embrace the top portion of an article, such as the cap, and a finger adapted to engage the base portion of an article, to slide the article longitudinally off a dead plate and into a carton. The structure which engages the article is preferably a demountable jaw having article engaging elements 48, 49 and 50. The configuration of the elements 48—50 will vary depending upon the configuration of the article. The objective, of course, is to move the article off the dead plate in such a way that it will fall freely and vertically and to avoid being hung up on any of the corners of the carton.

The transverse loading arm is driven by a link 52 having one end 53 pivotally mounted intermediate the ends of the arm 21 and its other end pivotally connected to the eccentric pin 42.

It will be appreciated that considerable variation in the strokes of the transverse and longitudinal loading arms is permitted by changing the plate 22 or the pivotal connections of the respective links 40 and 52.

The articles indicated at 31 are conveyed single file on an endless belt 55 to a location 56 which is normally in engagement with the article stop 32 and which is adjacent the carton conveyor and at a level above the cartons. The endless belt conveyor may be driven by a separate motor indicated at 57 through a gear box 58, a chain 59 and a shaft 60 having a belt pulley 61 fixed to it over which the belt 55 passes.

The upper flight of the belt rides on a plate 62 which thus supports the articles as they are conveyed to the loading location 56. The plate 62 also has a dead plate extension 63 projecting over the carton conveyor so as to overlie the open ends of the cartons 10 as they pass underneath. The transversely movable arm 20 brings the articles 31 over the dead plate and the longitudinally movable loading arm 21 slides the articles 31 off the dead plate into the cartons.

The plate 62 also supports a fixed guide 65 and an adjustable guide 66 whose transverse position is adjustable by the threaded rod 67 which is adjustably fixed to a post 68 mounted on the plate 62. The guides 65 and 66 channel the articles 31 single file to the loading location and their spacing is adjustable to accommodate the different sizes of articles.

In the operation of the embodiment of FIGS. 1—5, the cartons 10 are erected by generally conventional equipment and are conveyed between their respective transport lugs 11 by the transport chains 12 in a linear direction alongside the loading location 56. As shown, the upper ends of the cartons are open.

The articles 31 are conveyed on the endless belt 55 to the loading location 56 in single file. The arm swings transversely toward the south as viewed in FIG. 3 to the extent that the pocket 30 is in line with the line of articles. The pressure of the upstream articles as driven by the conveyor drives the lead article into the pocket 30. As can best be seen in FIG. 4, the arm reverses its movement and carries the lead article across the plate 62 and onto the dead plate 63. This transverse movement of the loading arm 21 brings the article stop 32 across the incoming file of articles and thus blocks further movement of them. Movement of the article onto the dead plate 63 brings it into the jaw of the longitudinally movable arm 21. As shown in FIG. 5, the arm 21 sweeps the article in a longitudinal direction off the dead plate thereby dropping it in a vertical direction into its respective carton 10. This movement is not impeded by the transverse arm, for the pocket 30 is open in the direction of movement of the carton.

The embodiment of FIGS. 6—9 is similar in many respects to the first embodiment. Two principal differences between the embodiments are: first, that the second embodiment eliminates the longitudinal loading arm relying solely on the transverse loading arm for picking off articles from the single file group and depositing them into cartons; and second, that a cam actuated spring biassed drive is provided for the transverse arm.

As in the previous embodiment, cartons 10 are conveyed between transport lugs 11 on transport chains 12, the cartons riding over a plate 13. Each carton has a tuck flap 14 and in this embodiment the side flaps 15 project in a vertical direction above the plane of the fixed plate 62. As will be described below, the side flaps 15 are used in part to guide the articles into the cartons. Another advantage to the outwardly projecting side flaps is that the closing of the cartons after they have been loaded is simplified.

The articles are brought up to the loading locations 56 in the manner described in connection with the first embodiment, that is, by means of a belt 55 whose upper flight rides over the fixed plate 62. The articles are confined between fixed and adjustable guide plates 65 and 66, respectively, to channel the articles 31 into single file order.

The transversely movable loading arm 20 again mounts a post 35 which is fixed at its upper end to L-shaped lever 37, the lever 37 being pivoted at 38 to a bracket forming part of the framing structure 39 of the machine. The arm 20 includes the pocket 30 and article stop 32. The pocket 30 being L-shaped is open in front and open at its end 33 to permit the retraction of the arm before the article has completely dropped into the carton.

In the present embodiment a curved or angulated guide 70 is mounted on a post 71 attached to the fixed structure of the apparatus indicated at 39 to assist in guiding the articles into their respective cartons and to avoid their tilting backwards and being hung up in a partially inserted condition.

The drive for the transverse loading arm includes an open cam 75 which is mounted on the shaft 23 which is driven, as before, by the carton conveying mechanism. The cam is engaged by a roller 76 rotatably mounted on a follower arm 77 which is pivoted to the framing structure 39. A spring 78 fixed at one end 79 to the frame 39 engages the end 80 of the follower arm 77 and holds the roller 76 in engagement with the surface 81 of cam 75. The end 80 of the follower arm 77 is also pivotally connected to an adjustable link 82, the other end of the link being pivotally connected intermediate the ends of the L-shaped lever 37.

A latch arm 90 having a latching surface 91 is pivotally mounted at 92 below the lever 37. Surface 91 is engageable with the lever 37 to block its loading movement, that is, to prevent it from swinging an article into a space where no carton is present. The surface 91 moves into latched engagement upon energization of a solenoid 93. The armature of the solenoid is connected through a spring 94 to the arm 90. Thus on energization of the solenoid, the arm is urged upwardly but may be blocked from upward movement by the engagement with the lever 37. When the arm 37 passes beyond the latching surface 91 (moving toward the right as viewed in FIG. 7) the spring will automatically urge the arm into latched condition. The cam 75 drives the lever 37 toward the right a distance slightly beyond the latching surface 91 so that if the solenoid is deenergized, the latching arm 90 will be free to drop to its inoperative position.

Operation of the solenoid is initiated by a detector 95 having a microswitch which is actuated when the absence of a carton between the transport lugs is detected.

In the operation of the second embodiment, the cartons are conveyed between their respective transport lugs preferably linearly through the loading location 56. Articles are conveyed single file by the endless belt conveyor 55 to the loading location where they are blocked by the article stop surface 32 of the transversely movable loading arm 20. The loading arm 20 reciprocates to the south as viewed in FIG. 8 and captures an article in the pocket 30. Its movement is reversed (FIG. 9) and the pocket 30 carries the article 31 across the plate 62 and over a respective carton 10. The article moves between the upwardly projecting side flaps 15 which guide the article, freely falling, into the carton.

As the lead article is loaded into the carton, the remaining file of articles is blocked from further movement by the engagement of them with the article stop 32.

If the transport lugs fail to pick up a carton, the absence of the carton will be detected by the detector 95 which will cause the energization of the solenoid 93. Upon energization of the solenoid 93, its armature moves upwardly applying tension to the spring 94. As soon as the lever 37 passes to the right beyond the latching surface 91, the latch arm 90 will snap into latching position and block the movement of the loading arm thus preventing the dropping of an article onto the conveyor where there is no carton.

I claim:

1. Apparatus for loading articles vertically into cartons comprising:
   an endless carton conveyor for conveying cartons having open upper ends;
   an endless article conveyor for conveying articles to a location adjacent and above said carton conveyor;
   a loading arm having an article engaging portion movable between a position in which it receives an article from said article conveyor and a position in which it overlies said carton conveyor;
   a dead plate overlying said carton conveyor adjacent said loading arm, said dead plate blocking the drop of articles into cartons;
   a second loading arm having a jaw movable between a position over said dead plate where it can receive an article from said first loading arm, and a position beyond said dead plate over said carton conveyor where it can drop articles into said cartons; and
   timing means interconnecting said carton conveyor and said loading arms for moving said loading arms in timed relation to said carton conveyor, whereby an article can be swung over said carton conveyor, with the passage of each carton to deposit said article in said carton.

2. Apparatus according to claim 1 further comprising a linkage connecting said second loading arm to said timing means.

3. Apparatus for loading articles vertically into cartons comprising:
   an endless carton conveyor for conveying cartons having open upper ends;
   an endless article conveyor for conveying articles to a location adjacent and above said carton conveyor;
   a loading arm having an article engaging portion movable between a position in which it receives an article from said article conveyor and a position in which it overlies said carton conveyor; and
   timing means interconnecting said carton conveyor and said loading arm for moving said loading arm in timed relation to said carton conveyor, said timing means including a cam rotatably driven by said carton conveyor drive, said cam having an open cam surface, a follower engaging said cam, means connecting said follower to said loading arm, spring means normally holding said follower in engagement with said cam surface, latch means operatively associated with said loading arm to block movement of said arm toward said carton conveyor, and means for detecting the absence of a carton on said conveyor and then initiating the operation of said latch means, whereby an article can be swung over said carton conveyor with the passage of each carton to deposit said article in said carton.

4. A method of loading cartons with articles, each article being dropped into a carton from above, comprising the steps of:
   spacing a series of cartons in a predetermined, fixed relation relative one to the other on a conveyor, said cartons being open at the top;
   moving said carton conveyor in a continuous manner through a loading station;
   supplying a series of articles to be loaded to a dead plate within said loading station, said dead plate being located at a height above the open top of each carton and said articles being continuously urged toward said dead plate;
   sweeping a loading arm in timed sequence relative to said continuously moving carton conveyor as each carton passes through said loading station between a first position whereat a bottomless pocket at least partially defined by that arm is located over said dead plate so that an article to be loaded can be embraced and restrained thereon and a second position whereat said bottomless pocket is located over the open top of a carton so that the article can be moved off said dead plate and dropped into the carton from the top thereof; and
   causing each article to move substantially longitudinally of said carton conveyor after each article is positioned over the top of each carton and as same is being moved out of and dropped from said bottomless pocket, the longitudinal motion of each article being in the motion direction of said carton conveyor and substantially matching the rate of said carton conveyor's movement to insure that each article falls into and is seated within a carton.

5. A method as set forth in claim 4 wherein each article's longitudinal motion is caused by embracing each article with a second loading arm, said second loading arm being subjected to a longitudinal motion relative to said carton conveyor in timed sequence with the sweeping motion of said loading arm.

6. A method as set forth in claim 4 wherein each carton has a tuck flap and two side flaps, said side flaps standing substantially upright as each carton moves through said loading station, and wherein each article's longitudinal motion is caused by embracing each article between said side flaps, each article being so moved into embracing relationship with said flaps by said loading arm.

7. A method as set forth in claim 4 wherein the motion path of said bottomless pocket is substantially transverse to the motion path of said carton conveyor.

8. A machine for loading cartons with articles, each article being dropped into a carton from above, comprising:
   a carton conveyor for conveying a series of cartons open at their tops, said carton conveyor having spacers associated therewith by which said cartons are carried in a predetermined, fixed relation relative one to the other, and said carton conveyor being adapted to move in a continuous manner;
   a loading station adjacent said carton conveyor, said loading station having a dead plate located at a height above the open tops of said cartons as said cartons are moved through said loading station;
   an article conveyor for supplying a series of articles to be loaded to said dead plate, said articles being continuously urged toward said dead plate by said article conveyor;
   a loading arm having structure at least partially defining a bottomless pocket operatively related to said loading station, said loading arm being adapted to move between a first position whereat said bottomless pocket is located over said dead plate so that an article to be loaded can be embraced and restrained thereon and a second position whereat said bottomless pocket is located over the open top of a carton so that the article can be moved off said dead plate and dropped into the carton from the top thereof;
   timing means interconnecting said carton conveyor and said loading arm in timed relation such that an article is swung over the top of each carton as each carton passes through said loading station; and
   means associated with said loading station for moving each article substantially longitudinally of said carton conveyor as each article is positioned over the top of a carton and as same is dropped from said loading arm's pocket, the longitudinal motion of each article being in the motion direction of said carton conveyor and substantially matching the rate of said carton conveyor's movement to be sure that each article falls into and is seated within a carton.

9. A machine as set forth in claim 8 wherein said means for moving each article longitudinally of said carton conveyor includes:
   a second loading arm having a jaw movable longitudinally relative to said carton conveyor, said second arm being adapted to receive each article from said first loading arm and move that article to a position off said dead plate whereat it drops into a carton; and
   linkage connecting said second loading arm to said timing means.

10. A machine as set forth in claim 8 whereat said means for moving each article longitudinally of said carton conveyor includes:
    two side flaps mounted to each carton carried on said carton conveyor, said side flaps standing substantially upright as each carton moves through said loading station, and each article being moved into embracing relationship with said side flaps by said loading arm through said timing means.

11. The method of loading articles into cartons by dropping same into the top thereof comprising the steps of:
    continuously conveying cartons in regularly spaced relation with their upper ends open;
    conveying articles single file into a position above and adjacent said cartons;
    repeatedly picking off the lead article from said single file and causing it to move in the conveying direction of the cartons while simultaneously blocking movement of oncoming articles in said single file; and
    dropping that lead article into the open end of one of the continuously moving cartons positioned therebeneath as the article is moving at substantially the same rate of speed and in substantially the same direction as the carton.

12. Apparatus for loading articles into cartons by dropping same into the tops thereof including:

means for continuously conveying cartons in regularly spaced relation with their upper ends open;

means for conveying articles into a position above and adjacent said cartons;

means for repeatedly picking off the lead article from said article conveying means and causing it to move in the conveying direction of the cartons while simultaneously blocking movement of oncoming articles; and means for dropping that lead article into the open end of one of the continuously moving cartons positioned therebeneath as the article is moving at substantially the same rate of speed and in substantially the same direction as the carton.

13. Apparatus according to claim 3 in which said latch means includes a latch bar, a solenoid, and a spring connecting said latch bar to said solenoid, the spring permitting delay of movement of said latch bar to latching position until said unloading arm is in its article receiving position.

14. Apparatus for loading articles vertically into cartons comprising:

an endless carton conveyor and conveying cartons having open upper ends;

means for driving said conveyor in a first direction;

an endless article conveyor for conveying articles to a location adjacent and above said carton conveyor;

means for driving said article conveyor in a direction opposite to said carton conveyor;

a horizontal loading arm having a pocket adjacent said carton conveyor and an article stop projecting away from said carton conveyor;

means for moving said arm between a first position in which said pocket overlies said carton conveyor and said arm blocks advance of articles and a second position in which said pocket can receive an article from said article conveyor;

and timing means interconnecting said carton conveyor and said loading arm for moving said loading arm in timed relation to said carton conveyor whereby an article can be swung over said carton conveyor and dropped into a carton.

15. Apparatus according to claim 14 further comprising a low friction material covering said pocket and said article stop to minimize abrasion of said articles.

16. Apparatus according to claim 14 in which said pocket is L-shaped being open toward said article conveyor and said carton conveyor whereby it can freely receive articles, convey them toward said carton conveyor and begin a return stroke while the articles are dropping into cartons.

17. Apparatus according to claim 14 in which said article conveyor comprises an endless belt and two longitudinally extending guides overlying said belt to guide said articles single file to a loading location.

18. Apparatus according to claim 17 in which one of said guides is transversely adjustable to permit variations in the width of articles conveyed.

PO-1050
(5/69)

UNITED STATES PATENT OFFICE
CERTIFICATE OF CORRECTION

Patent No. 3,574,986    Dated    April 13, 1971

Inventor(s)    Julian A. Dieter

It is certified that error appears in the above-identified patent and that said Letters Patent are hereby corrected as shown below:

Column 3, Line 48, "outwardly" should be --upwardly--.

Column 5, Line 72, after "with", "said" should be --side--.

Signed and sealed this 19th day of October 1971.

(SEAL)
Attest:

EDWARD M. FLETCHER, JR.        ROBERT GOTTSCHALK
Attesting Officer              Acting Commissioner of Pat